US009300566B2

(12) United States Patent
Kampmann et al.

(10) Patent No.: US 9,300,566 B2
(45) Date of Patent: Mar. 29, 2016

(54) TOPOLOGY CHANGE IN A NETWORK WITH RING TOPOLOGY

(75) Inventors: Dirk Kampmann, Vaals (NL); Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/127,519

(22) PCT Filed: Jun. 28, 2011

(86) PCT No.: PCT/EP2011/060855
§ 371 (c)(1),
(2), (4) Date: Feb. 5, 2014

(87) PCT Pub. No.: WO2013/000507
PCT Pub. Date: Jan. 3, 2013

(65) Prior Publication Data
US 2014/0169223 A1    Jun. 19, 2014

(51) Int. Cl.
*H04L 12/751* (2013.01)
*H04L 12/437* (2006.01)
(Continued)

(52) U.S. Cl.
CPC .............. *H04L 45/02* (2013.01); *H04L 12/437* (2013.01); *H04L 41/0668* (2013.01); *H04L 45/22* (2013.01); *H04L 45/42* (2013.01)

(58) Field of Classification Search
CPC ............ H04B 17/00; H04J 14/00; H04J 3/14; H04L 12/24; H04L 12/26; H04L 12/28; H04L 12/56; H04L 12/751; H04L 12/801
USPC ......... 370/222, 224, 235, 238, 244, 254, 255, 370/258, 400, 406, 468; 398/25, 45
See application file for complete search history.

(56) References Cited

U.S. PATENT DOCUMENTS

2006/0133300 A1\* 6/2006 Lee et al. ................. 370/254
2007/0171832 A1\* 7/2007 Agmon et al. ............ 370/238
(Continued)

FOREIGN PATENT DOCUMENTS

EP    1672851 A1    6/2006

OTHER PUBLICATIONS

Wolf, Tilman; "In-Network Services for Customization in Next-Generation Networks" University of Massachusetts Amherst, IEEE Network, Jul./Aug. 2010, pp. 6-12.\*
(Continued)

*Primary Examiner* — Charles C Jiang
*Assistant Examiner* — Wali Butt
(74) *Attorney, Agent, or Firm* — Murphy, Bilak & Homiller, PLLC (57) ABSTRACT

The invention relates to a method for controlling, by a central control entity (200), a topology change in a network having a ring topology with a plurality of ring nodes (110-150) via which data packets of various data transfers are transmitted to their corresponding destination nodes. The method comprising the steps of receiving information about a topology change of the ring topology of the network, determining which of the data transfers are affected by the topology change, determining, for each of the affected data transfers, a new path through the network, determining new switching instructions for ring nodes (110-150) that are affected by the new paths determined for the affected data transfers, and transmitting the new switching instructions to the affected ring nodes (110-150).

13 Claims, 11 Drawing Sheets

(51) Int. Cl.
  *H04L 12/24*   (2006.01)
  *H04L 12/707*  (2013.01)
  *H04L 12/717*  (2013.01)

(56) References Cited

U.S. PATENT DOCUMENTS

2010/0214909 A1    8/2010   Ceccarelli et al.
2011/0286324 A1*  11/2011   Bellagamba et al. ......... 370/219

OTHER PUBLICATIONS

ITU, "Ethernet Ring Protection Switching." International Telecommunication Union, ITU-T G.8032. Mar. 2010. 1-24.

Unknown, Author, "Forwarding and Control Element Separation (forces)." IETF Datatracker. Available online at: http://datatracker.ietf.org/wg/forces/. Mar. 19, 2014.

ITU, "OAM functions and mechanisms for Ethernet based networks." International Telecommunication Union—Standardization Sector, Y.1731. Feb. 2008. 1-82.

Unknown, Author, "Open Networking Foundation." Homepage. Available online at: https://www.opennetworking.org/. 2014.

Unknown, Author, "OpenFlow." Homepage. Available online at: http://archive.openflow.org/. 2011.

Yang, L. et al. "Forwarding and Control Element Separation (ForCES) Framework." Network Working Group Request for Comments 3746. The Internet Society. 2004.

\* cited by examiner

TOPOLOGY CHANGE IN A NETWORK WITH RING TOPOLOGY

The present invention relates to a method for controlling a topology change in a network with a ring topology with a plurality of ring nodes, the control being carried out by a control entity, to a method for detecting a topology change by a ring node, to the central control entity controlling the topology change and to the ring node of the network.

BACKGROUND

Figure 1:
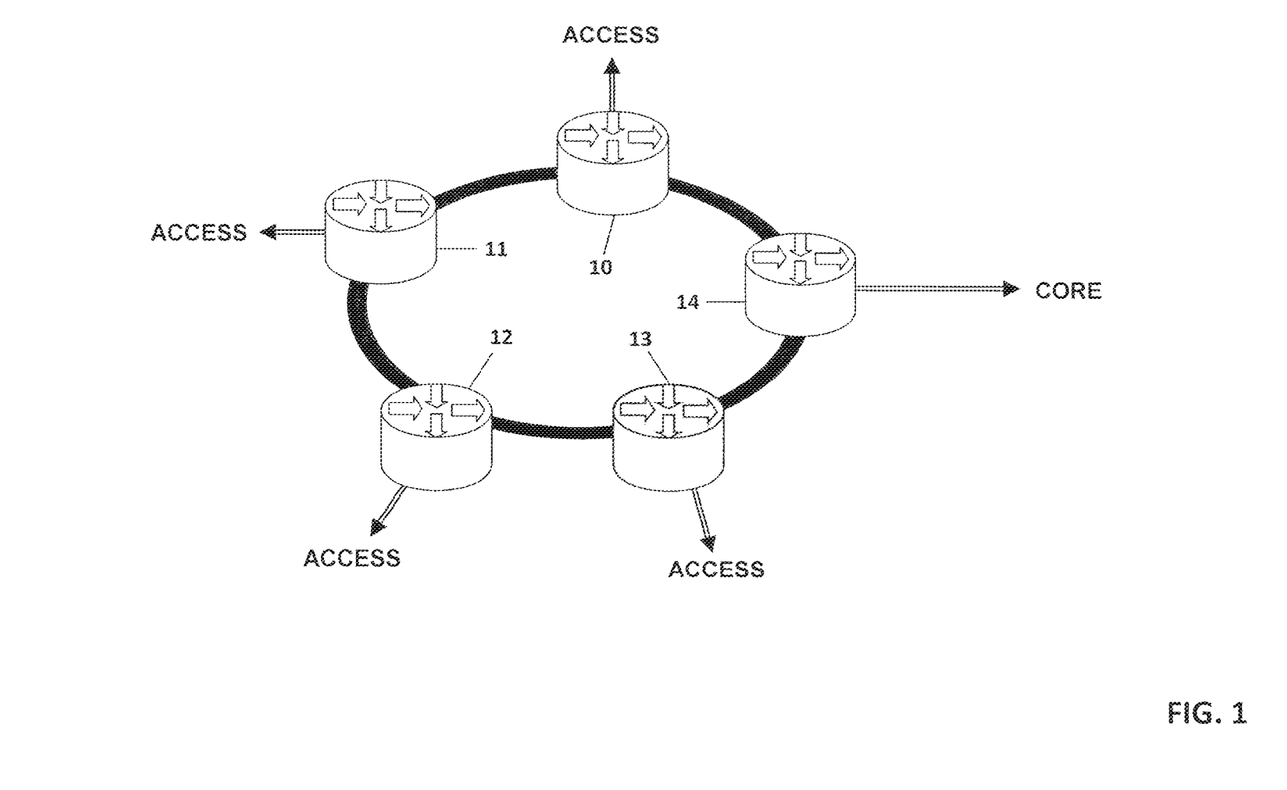
FIG. 1 shows a ring topology as known in the art.

A ring topology is a standard topology used in current transport network design. In this topology multiple transport nodes are interconnected to each other in the shape of a ring. As show in FIG. 1, a ring topology comprises two or more ring nodes 10-14. Each node in the ring has exactly two neighbours and the ring nodes 10-14 may be connected to other nodes in order to support traffic in surging into or abstraction from the ring topology.

Ring topologies are used with various transport technologies, by way of example optical transport networks (OTN) or electrical transport networks based on SDH (Synchronous Digital Hierarchy), ATM (Asynchronous Transfer Mode) or Ethernet standards.

Furthermore, a split router architecture is known, a concept which is currently being discussed and under development in various groups, for example in the Forwarding and Control Entity Separation (ForCes) Working Group in IETF (http://datatracker.ietf.org/wg/forces/), the group developing the OpenFlow Protocol, OpenFlow Switch Specification, Version 1.1.0, http://www.openflow.org/ or the recently created Open Network Foundation group, Open Network Foundation website, http://www.opennetworkfoundation.org/.

The split router architecture proposes to split a common router in two elements: a control element responsible for managing the routing protocol and the connectivity of the data plane. A control element controls the data plane connectivity through a forwarding element. The forwarding element is responsible for forwarding traffic in the data plane and establishes connectivity to a neighbour node based on the instructions received from the control element.

Ethernet is a widely used transport standard that specifies the physical transport layer and part of the data link layer, for example addressing. A ring topology using the Ethernet standard causes some complications. Ethernet and partly protocols above Ethernet provide automatic data path detection and selection. Those protocols must ensure that data are not sent in a loop. Various protocols are proposed to provide loop detection and loop prevention, for example the Spanning Tree Protocol, STP, and improved variants of this protocol like Rapid Spanning Tree Protocol, rSTP. These protocols provide a slow failure detection and failure handling in case a link breaks or a node fails. This failure detection and handling is in the order of seconds, this slow handling is not comparable with fail-over times achieved with the SDH technology where the failure detection handling is in the order of 50 milliseconds. A new procedure was developed in ITU-T to improve the fail-over time for Ethernet ring topology: the Ethernet ring protection switching, ITU-I G.8032/Y.1344, Ethernet ring protection switching, http://www.itu.int/rec/T-REC-G.8032-201003-I.

The specification proposes the ring automatic protection switching (R-APS) protocol to manage the connectivity and node availability in the Ethernet ring. Further functionality defined in the ITU-T recommendation "OAM functions and mechanisms for Ethernet based networks", ITU-T Y.1731, OAM functions and mechanisms for Ethernet based networks, http://www.itu.int/rec/T-REC-Y.1731-200802-I is used to monitor the availability of links immediately connected to a node.

Figure 2:
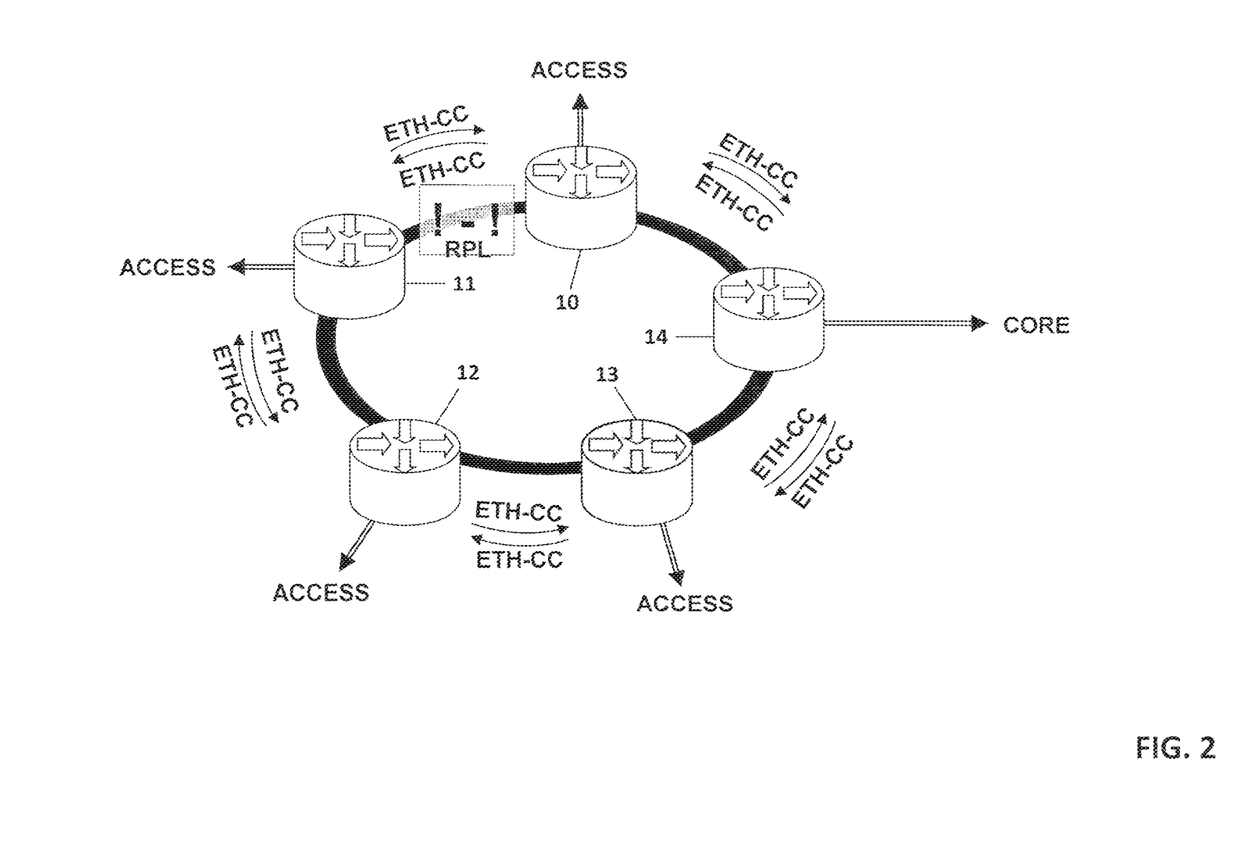
FIG. 2 shows a ring topology in which one link is closed as ring protection link as known in the art.

While OAM (Operations Administration and Maintenance) functions are used in each node to monitor the availability of the directly connected links, the R-APS protocol is used to exchange this information between all nodes in the ring. Finally, each node receives an overview of the availability of links and nodes in the ring. In case of failure, independent decisions are taken in each node to find an alternative route for the traffic bypassing the failed link or node. The concept of the Ethernet protocols used to prevent Ethernet loops is shown in FIG. 2 and a closed dedicated link for data traffic. This applies for STP, its variants and R-APS. In G.8032 the closed link is called ring protection link, RPL. Ethernet OAM traffic can still path through the RPL to monitor the link availability but other traffic is prohibited. In the embodiment shown in FIG. 2, the link between ring nodes 10 and 11 is closed and thus plays the role of the ring protection link in the example shown in FIG. 2.

As a consequence, the traffic cannot take the shortest path in all cases. By way of example, traffic from ring node 10 to ring node 11 has to path through 14, 13 and 12 as the direct connection to ring node 11 is closed. The ring protection link impacts the overall transport capacity that can be achieved in the Ethernet ring topology.

It is not easy to overcome this situation. The approach in Ethernet based networks is to run each transport node independently from one another. Each node detects the network topology by means of specific topology detection protocols. Based on information gained, each node makes an independent decision based on a common decision model to decide on how to route traffic in a network. The final model shall ensure that the final data paths are always loop-free.

SUMMARY

In view of the above-said a need exists to improve the overall transport capacity in a network with a ring topology while at the same time keeping the reaction time for a detected topology change low.

This need is met by the features of the independent claims. In the dependent claims preferred embodiments of the invention are described.

According to a first aspect of the invention a method for controlling, by a central control entity, a topology change in a network having a ring topology is provided, the network containing a plurality of ring nodes via which data packets of various data transfers are transmitted to their corresponding destination nodes. The method comprises the step of receiving information about a topology change of the ring topology of the network. In an additional step it is determined which of the data transfers are affected by the topology change and for each of the affected data transfers a new path through the network is determined. Furthermore, new switching instructions are determined by the central control entity for the ring nodes that are affected by the new paths determined for the affected data transfers. Additionally, the central control entity transmits the new switching instructions to the affected ring nodes. With the use of a central control entity controlling the reaction of the different ring nodes for a topology change, the use of a ring protection link can be avoided as the central control entity determines the switching instructions for the ring nodes. The ring nodes in the ring topology play the role of a forwarding element which is controlled by a central control entity.

Additionally, it is possible that the central control entity configures, for a data transfer to a destination node, in each of the ring nodes for each input port of the ring node a first output port for said data transfer to said destination node and an alternative output port for said data transfer to said destination node. This configuration of the different ring nodes by the central control entity allows the ring nodes to react quickly to a topology change. When the ring node detects a topology change which affects a data transfer, the ring node can switch the traffic from the first output port to the alternative output port. The central control entity configures the two output ports for each data transfer and thus configures the path of a data transfer through the network as the relationship between an output port of one ring node and the input port of a neighbouring ring node is fixed by the physical cabling. Inside the ring structure the central control entity can select the preferred output port for a data transfer to a destination node. Furthermore, for each input port, and thus for each path through the ring, an alternative output port is pre-configured in a ring node by the central control entity. If a data transfer is interrupted at the first output port due to a topology change, the ring node can react by switching from the first output port to the alternative output port. This allows a short reaction time by the ring node as the ring node can quickly switch to the alternative output port when it detects a topology change.

Furthermore, it may be possible that when the central control entity receives information about a topology change it determines new switching instructions that contain information about a new first output port that is the preferred output port for said data transfer to said destination node taking into account the topology change. This allows a two-stage procedure. The first stage is the reaction at the ring node by changing from one pre-configured output port to the other pre-configured output port, the second stage is the determination of the switching path by the central control unit, taking into account the topology change, and the generation of the new switching instructions.

A topology change may be a failure such as a failure of a link or a failure of a ring node. However, the topology change may also include a capacity change of a link. By way of example, if the throughput capacity between two ring nodes drastically changes the traffic can be heavily influenced so that new switching instructions may become necessary to take the changed link capacity into account.

Furthermore, it is possible that the central control entity configures the ring nodes as to how to establish connectivity to neighbouring ring nodes. In this embodiment the central control entity determines the ring structure by instructing the ring nodes how to build the ring structure.

The central control entity may include the new switching instructions into labels of a multi-protocol label switching (MPLS) mechanism. MPLS is a data transfer mechanism in which the packet forwarding decisions are made on the contents of a label without the need to examine the data packet itself. Based on the labels, the ring node which works as a forwarding element switches the traffic either to the next ring node acting again as a forwarding element or switches the traffic out of the ring topology to its destination node.

Furthermore, it may be possible that the central control entity selects, for a data transfer between the same source node and the same destination node, among two different transfer paths. The selection of one of the two different transfer paths may then depend on a predefined criterion such as a predefined network requirement, e.g. a data rate requirement needed for a data transfer or depending on the load situation on the network. It becomes possible to route a data transfer needing a high quality of service along a short path and to route another data transfer demanding a lower quality of service along another path that may take longer.

The central control entity may, furthermore, determine the paths for a data transfer through a network in such a way that the transmission along a closed loop is avoided or prohibited.

Furthermore, it is possible that new switching instructions are only determined and transmitted to the affected ring nodes when a predefined network criterion is met. When a topology change is detected by a ring node, the ring node reacts by switching to the other output port if necessary. This changes the traffic situation over the ring nodes. The central control entity may then check first in dependence on a predefined network criterion such as the delay introduced by the new switching paths or the load situation at the different links if the calculation of new paths is necessary. If the central control entity determines that the situation as occurring after the ring node has switched to the other output port is acceptable in view of the delay required by a certain data transfer and/or in view of the load situation at the different links, the central control entity may determine not to generate new switching instructions and to keep the situation as it is.

The invention, furthermore, relates to a central control entity configured to control the topology change in the network having a ring topology with a plurality of ring nodes, the various data transfers being transmitted to their corresponding destination nodes via the ring nodes to their destination nodes. The central control entity contains a receiver configured to receive information about a topology change. Furthermore, a database is provided containing, for each of the ring nodes, information about possible connections of each ring node to other nodes of the network and about a status of the possible connections. The central control entity, furthermore, contains a processing unit configured to determine which of the data transfers are affected by the topology change. The processing unit may, furthermore, determine, for each of the affected data transfers, a new path through the network and is configured to determine new switching instructions for ring nodes that are affected by the new paths determined for the affected data transfers. The central control entity further contains a transmitter transmitting the new switching instructions to the affected ring nodes. By providing a central control entity the dataflow in the ring can be optimized.

The processing unit may work as described above. By way of example, the processing unit may configure, for a data transfer to a destination node, in each of the ring nodes for each input port of a ring node, two output ports to reach one destination node, a first output port describing a first preferred path for a data transfer to the destination node, the second or alternative output port describing an alternative path for said data transfer to said one destination node.

A data transfer may be considered as the number of packets belonging to a certain application that are transferred from the source node to the destination node for said application.

The invention, furthermore, relates to a method for detecting a topology change by the ring node, wherein each ring node contains a database in which, for each input port of the ring node and for each destination node, two output ports are stored. The ring node can detect a topology change at a neighbouring ring node, e.g. using non-failure detection protocols. In an additional step the ring node can determine, for each of the data transfers affected by the topology change and for which one of the output ports was selected, the other of the two output ports. Furthermore, the packets of the affected data transfer are switched along the other of the two output ports for each data transfer affected by the topology change. In an additional step the information about the topology change at the neighbouring ring node is transmitted to the central control entity controlling the ring nodes of the network. The ring node can react quickly to a topology change as it contains, for each output port, a pre-configured alternative that may be used in case of a topology change. The ring node can, thus, switch in a very short delay to the other output port for an affected data transfer and can then inform the central control entity which may then determine new switching instructions.

If the ring node is still part of a new path for the data transfer calculated by the central control entity in response to the received information about the topology change, the ring node may, furthermore, receive new switching instructions from the central control entity and may then apply the new switching instructions.

The ring node may, furthermore, establish the connections to the neighbouring ring nodes in accordance with the configuration instructions received from the central control entity.

The invention, furthermore, relates to the ring node working as described above, the ring node containing the database in which, for each input port and for each destination node, two output ports are stored. Furthermore, a detector configured to detect a topology change at a neighbouring ring node is provided, the detector being able to detect a topology change such as a failure of a ring node, a failure of the link to the ring node or a change in the data throughput capacity. The ring node, furthermore, contains a control unit which switches for the affected data transfer the packets of the affected data transfer along the other of the pre-configured output ports. Furthermore, a transmitter is provided transmitting an information about the topology change to the central control entity.

Furthermore, a central control entity is provided configured to control the plurality of ring nodes in a network with a ring topology, the central control entity containing a database containing, for each of the ring nodes, information about possible connections of each ring node to other nodes of the network and about the status of the possible connections, and a processing unit configured to configure in each of the ring nodes for each input port of a ring node two output ports to reach one destination node. The processing unit configures a first output port describing a first path for a data transfer to a destination node and an alternative output port describing an alternative path for the data transfer to said one destination node.

The invention, furthermore, provides a central control entity containing the above-mentioned database, wherein the processing unit is configured to select, for a data transfer between the same source node and the same destination node, among two different transfer paths, the processing unit selecting one of the two different transfer paths in accordance with a predefined network criterion such as the quality of service requirement, the present load situation in the network or delay requirements for a data transfer.

BRIEF DESCRIPTION OF THE DRAWINGS

The invention will be described in further detail with reference to the accompanying drawings.

DETAILED DESCRIPTION

Figure 3:
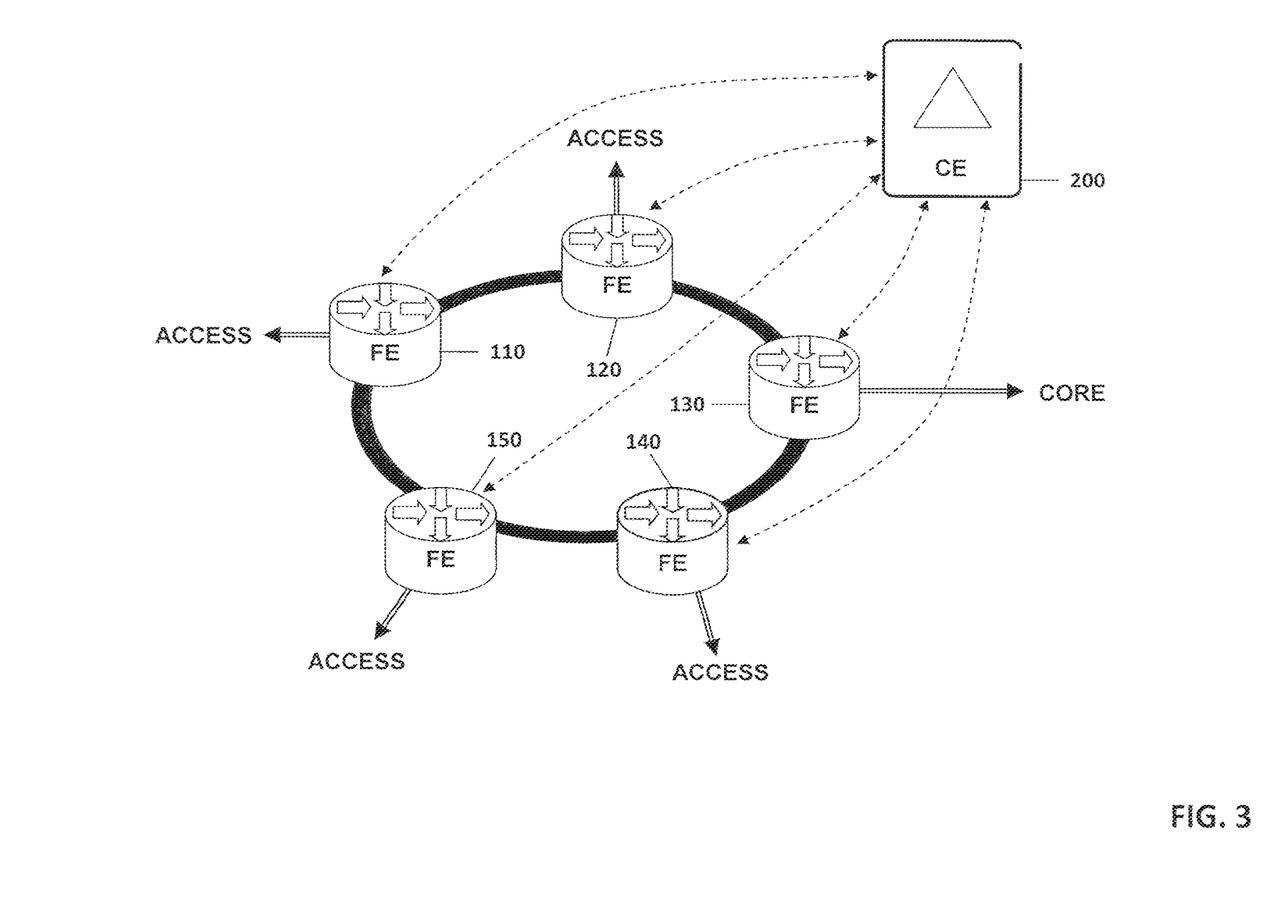
FIG. 3 shows a ring topology with a central control entity controlling the different ring nodes according to one embodiment of the invention.

In FIG. 3 a network having a ring topology is shown which uses the mechanism of the split router architecture in which the ring nodes 110-150 play the role of a forwarding element FE. The different nodes are controlled by one central control entity 200.

The router nodes 110-150 involved in the ring topology are replaced or are extended to act as forwarding elements of the split router architecture. In such an architecture the forwarding element is responsible for forwarding traffic in the data plane and establishes connectivity to neighbour nodes based on instructions received from a central control entity 200. Thus, the connectivity between the ring nodes 110-150 is under the control of the central control entity 200. The central control entity 200 can instruct the ring nodes to connect traffic in various ways according to detected traffic flows, protocol types or other means. Each ring node can forward traffic to its two neighbouring ring nodes or out of the ring topology to its destination node.

One option is that the central control entity configures for the dataflow dedicated paths identified by labels as it is done in MPLS. Based on labels the ring nodes can switch traffic to the next ring node or out of the ring topology. When the embodiment of FIG. 3 is compared to the embodiment used in the prior art shown in FIG. 2, it can be concluded that the need of a blocked traffic link such as the ring protection link between nodes 10 and 11 of FIG. 2 can be forwarded with the solution shown in FIG. 3. It should be understood that any other method may be used by the central control entity to instruct the ring nodes.

Figure 4:
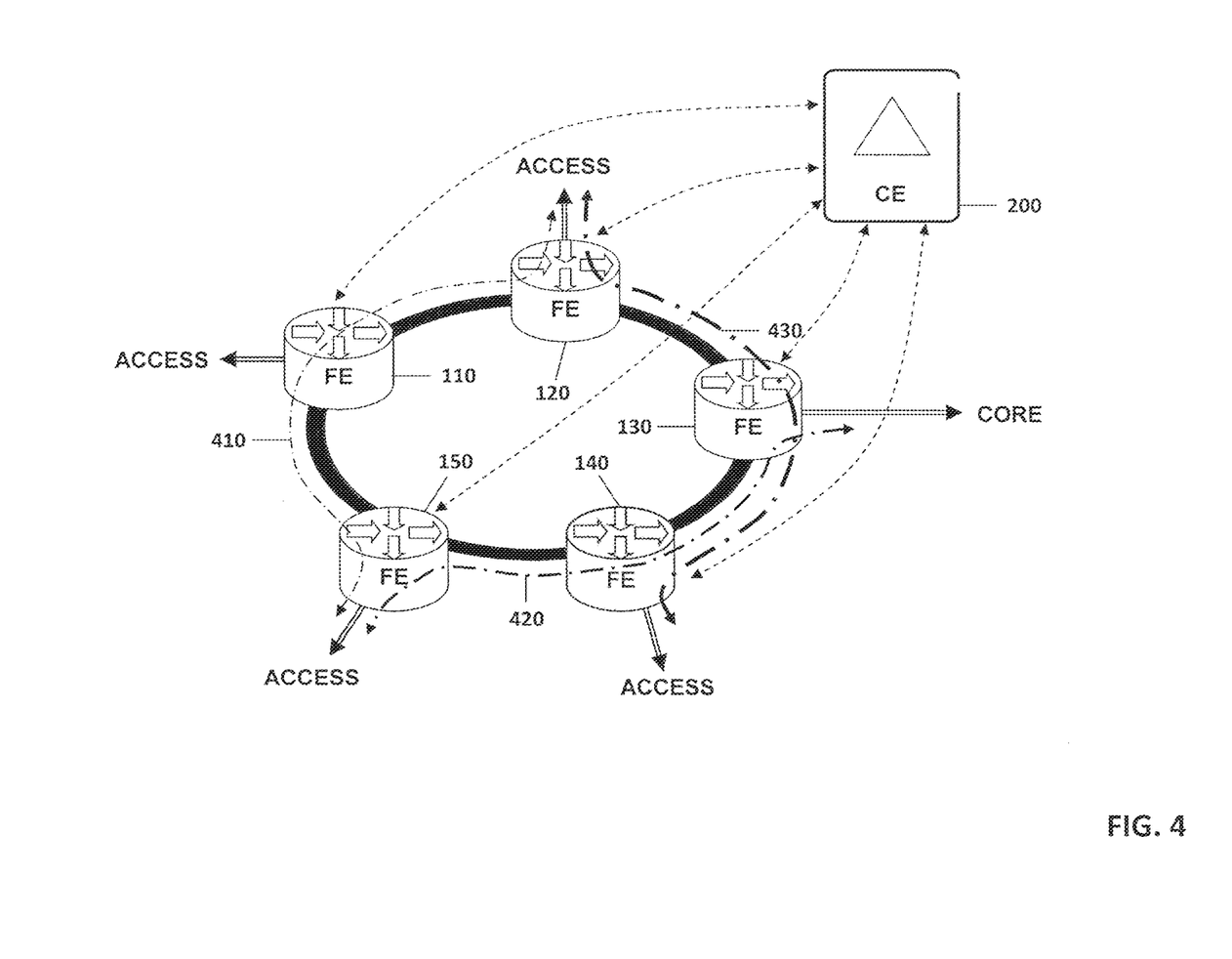
FIG. 4 shows an example of how different data transfers are switched based on the instructions from the central control entity.

In FIG. 4 different data transfers are shown, the paths of the various data transfers being determined by the central control entity 200. The central control entity determines, for each data flow from a starting node to a destination node, the path through the ring network and instructs the different ring nodes which output port for a data transfer arriving at a certain input port should be used. Outside the ring network, i.e. outside the area controlled by the central control entity, the data transfers are routed using standard packet forwarding (e.g. IP routing) mechanisms. In the embodiment of FIG. 4 the configurations determined by the central control entity for the switching of data transfers symbolized by the dashed lines from the different ring nodes to the central control entity. In the embodiment shown in FIG. 4 a first data transfer 410 enters the ring topology at node 150 and exits the ring topology at node 120. A further data transfer 420 is shown where data are exchanged between nodes 150 and 130. In a third data transfer 430 data packets are transmitted from node 120 via node 130 and exit the ring topology at node 140. The different data transfers and the paths through the ring topology are configured by the central control entity 200.

Figure 5:
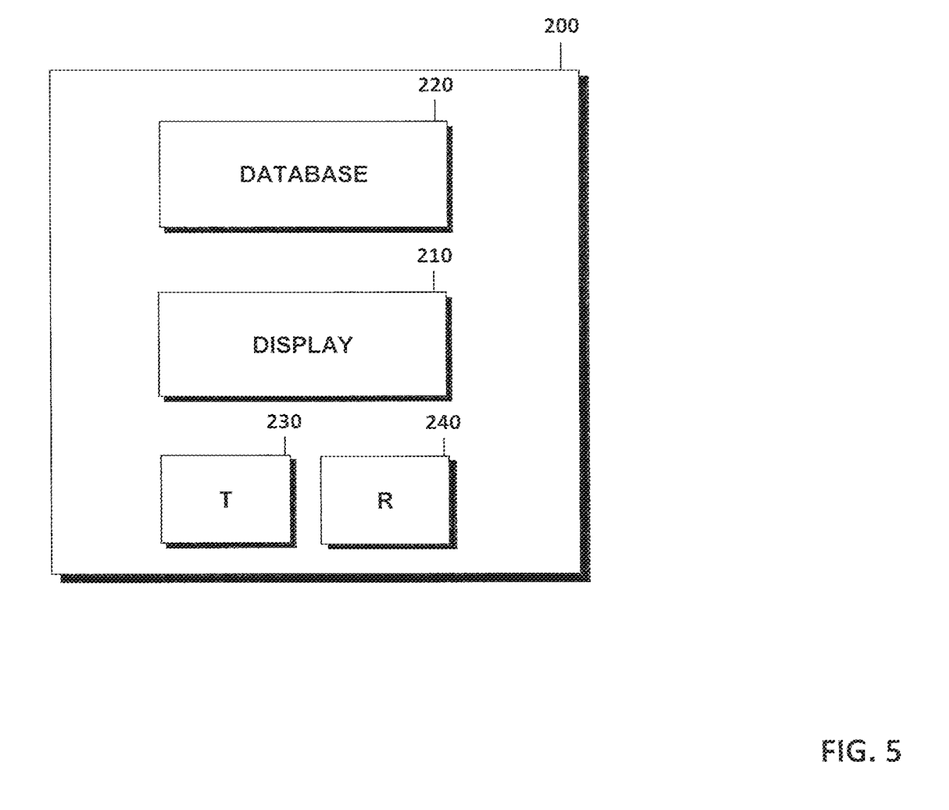
FIG. 5 is a schematic view of a central control entity configured to control the data transfers in the ring nodes.

In FIG. 5 a schematic view of the central control entity 200 is shown, the central control entity 200 containing a database 220 containing, for each ring node, information about possible connections of each ring node to other ring nodes, the database furthermore containing information about the status of the possible connections. A processing unit 210 is provided which controls the dataflow in the ring network. The central control entity, i.e. the processing unit 210, configures in each ring node two alternative paths to reach the same destination. One path goes clockwise, the other path goes counter clockwise. The processing unit determines, for each path through the network, in each network node of the ring network the output port a data transfer should take as a preferred path. At the same time it configures, in each ring node for an input port, an alternative output port that may be used when the traffic at the first input port cannot be transmitted to its destination anymore.

Figure 8:
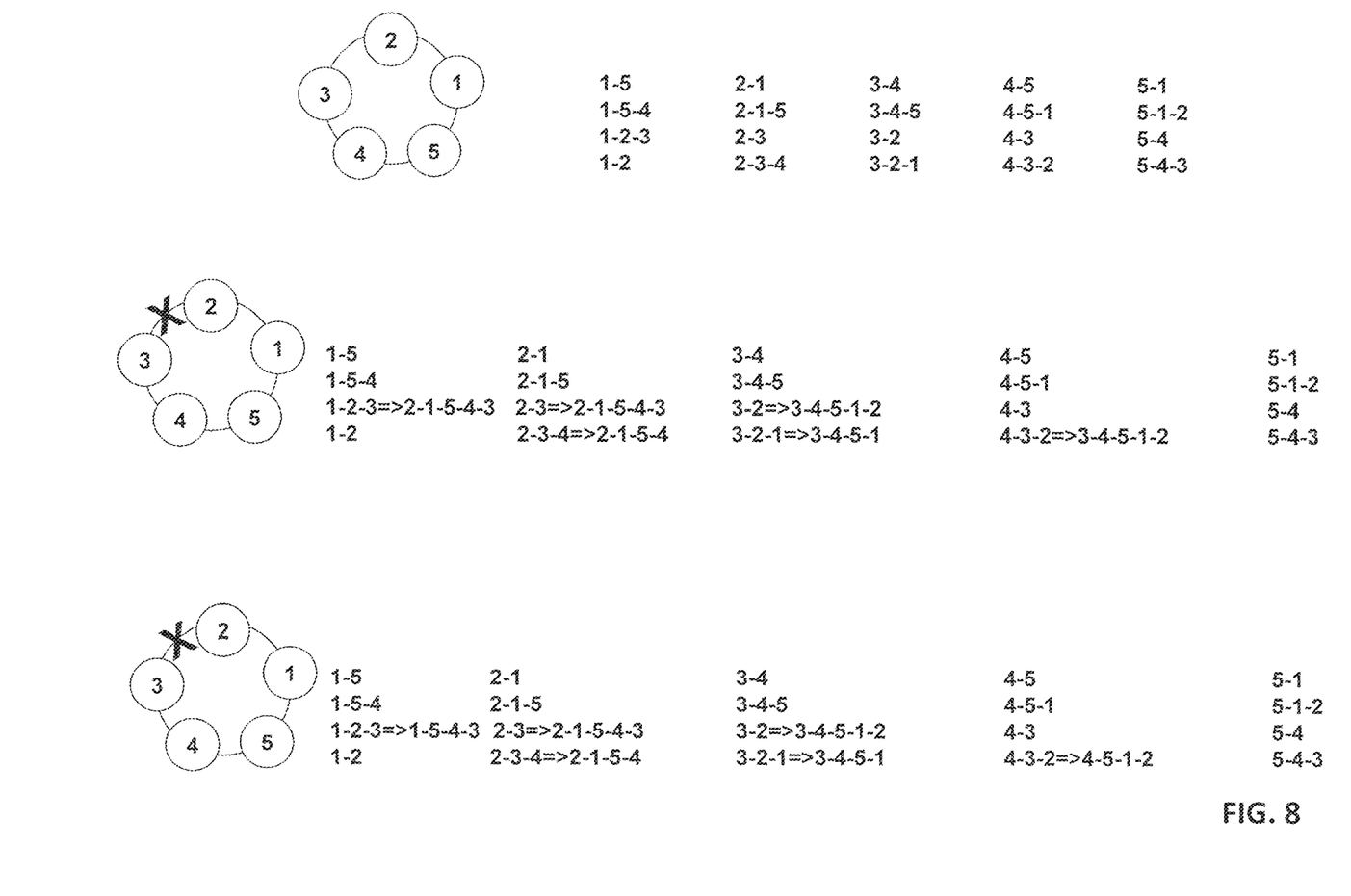
FIG. 8 shows different tables in a ring structure describing the different possible paths and describing the calculation of an alternative path in view of a link failure.

In the upper table shown in FIG. 8 the primary paths for a ring network having five ring nodes 1-5 are shown, in which the leftmost figure in the table indicates the entrance ring node, the rightmost figure describing the exit ring node, thus, the pair 1-5 indicates that a data transfer enters the ring topology at ring node 1 and exits the ring topology at ring node 5. In the table shown in FIG. 8 all possible data paths from all ring nodes are shown, the indicated paths being the preferred paths as determined by processing unit 210 in the central control entity. In the example shown, traffic entering in node 1 and which has its destination in a network behind node 3 should preferably go from node 1 via node 2 to node 3, 1-2-3 in short as shown in line 3 of the first column of FIG. 8.

A link failure is detected by a ring node by a detector 119 in a ring node, as will be explained in more detail further below. A topology change detected by a ring node is transmitted to the central control entity 200 which, as shown in FIG. 5, contains a receiver 240 where the information about the topology change is received. The processing unit 210 furthermore determines new switching instructions to the ring nodes in case of a link failure. The switching instructions are transmitted to the different ring nodes using transmitter 230.

In FIG. 5 and also in FIG. 6 explained further below, the entities are shown with their functional modules that are needed for the understanding of the present invention. It should be understood that more functional entities may be contained in the central control entity or the ring node or that fewer functional modules are contained in the central control entity when some of the modules 210-240 are incorporated into one module. Furthermore, the module shown may be incorporated by hardware or software or a by a combination of hardware and software.

Figure 6:
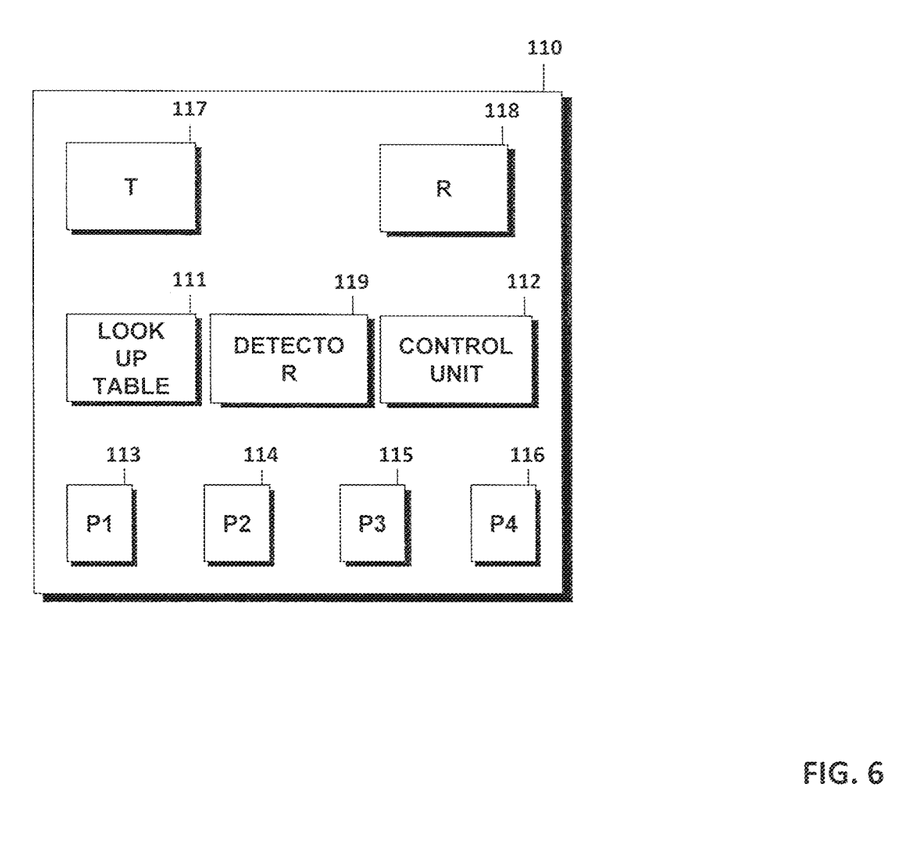
FIG. 6 is a schematic view of a ring node shown in FIG. 4.

In FIG. 6 a ring node which works as a forwarding element (FE) in the examples shown is schematically shown in more detail. The node 110 contains a look-up table or a database 111 in which, for each input port of the ring node and for each destination node, two output ports are stored. One of the two output ports is the preferred output port through which traffic arriving at an input port should be switched. The look-up table then further contains a second output port the ring node may use in case of a link failure. A control unit 112 can coordinate that when a detector 119 has detected a topology change at a neighbouring ring node, that the traffic is switched from the first output port to the alternative output port using look-up table 111. The different input and output ports of the ring node are symbolized by reference numerals 113-116. The ring node, furthermore, contains a transmitter 117 where the information that a topology change has been detected by detector 119 is transmitted to the central control entity 200. Furthermore, a receiver 118 can be provided via which the switching instructions from the central control entity are received. As in FIG. 5, the different modules may be incorporated by hardware, software or a combination of hardware and software.

Figure 9:
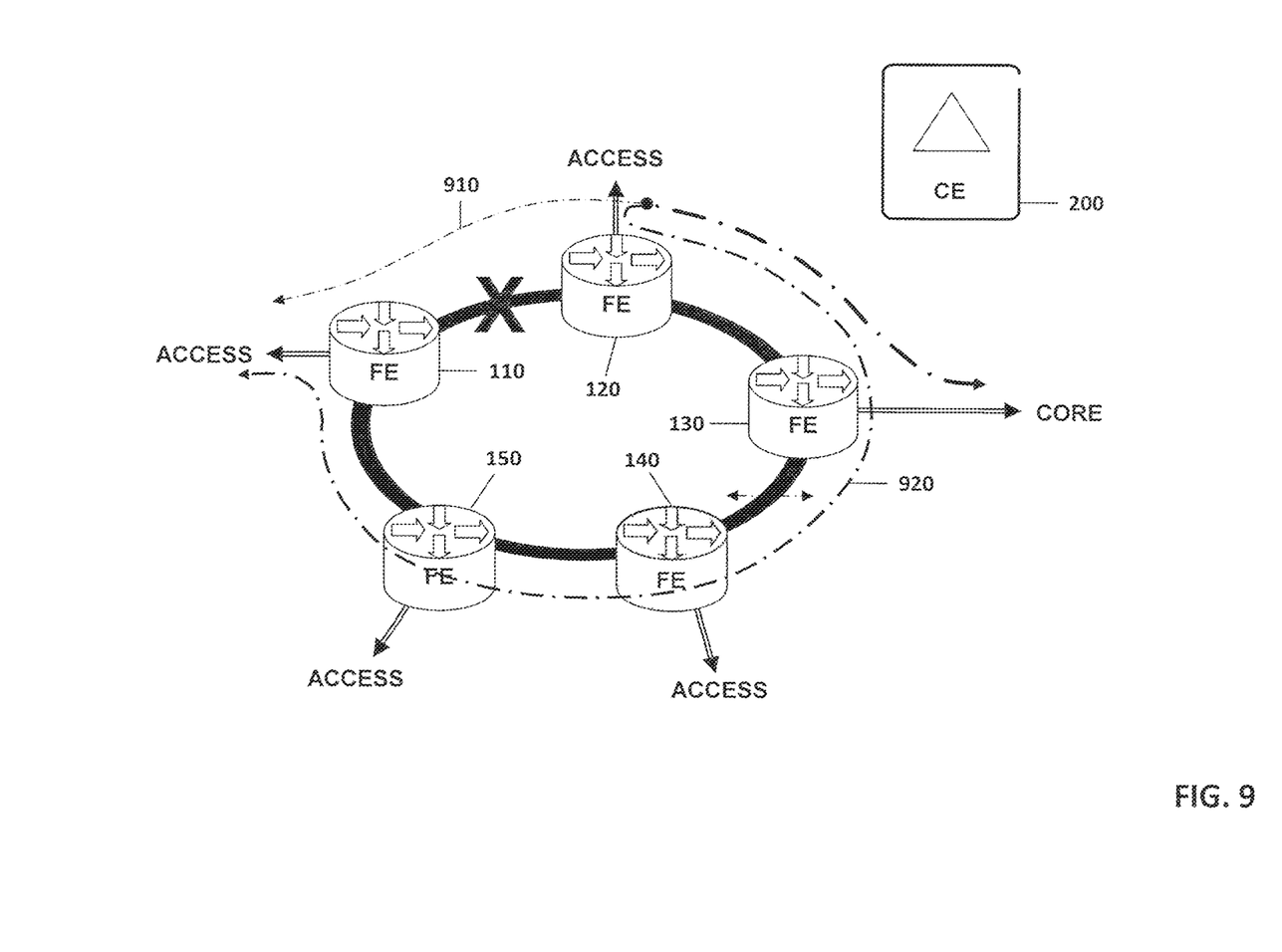
FIG. 9 shows a situation how a ring reacts to a link failure.

When a link or node failure or a traffic capacity change is detected by detector 119, each node can immediately switch the traffic to the alternative port stored in the look-up table 111. In FIG. 9 the example is shown where a link failure occurs between nodes 110 and 120. Before the link failure occurred the data transfer 910 entered the ring at node 130 from where it was transmitted to node 120 and from where it was transferred to node 110 where the traffic was exiting the ring topology. This link failure can be detected by node 120 using its detector explained above in connection with FIG. 6. Ring node 120 can immediately switch the traffic to the alternative port that does not pass the faulty link. Thus, in the example shown, the traffic is then switched from node 120 back to node 130 resulting in a data transfer 920 as shown in FIG. 9 from node 120 via node 130, 140, 150 to node 10. As shown in FIG. 9, the node can immediately react to the link failure so that the response time is very low.

The example shown in FIG. 9 is also shown in the middle table of FIG. 8, where the link failure at the same location between nodes 2 and 3 is symbolized. As shown in the middle table, under the assumption that the link failure occurs between nodes 2 and 3, this failure is immediately detected by nodes 2 and 3 so node 3 will, for every packet with a destination of node 2, change the routing label and route the packet based on the new label. This label swapping can be done using the look-up table shown in FIG. 6 in the node. In an alternative it is possible by simply toggling a single Bit of the received label. In the example shown in FIG. 8, normal traffic from node 1 to node 3 would normally travel as 1-2-3. But in node 2 the link failure to node 3 causes the label to be replaced and now the path would start in node 2 and would go clockwise via nodes 1, 5 and 4 to node 3 resulting in a path 1-2-1-5-4-3 in short. The middle table of FIG. 8 indicates which of the paths are affected by a link failure and what the alternative path would be. The preferred path and the alternative path were configured by the central control entity and are transmitted to the different nodes so that each node has an alternative for a link failure. The advantage of this configuration is that the fail-over time is very short, since only each affected ring node can detect and react locally on a failure event. The alternative path may not be optimal as certain nodes may have to be traversed twice (see the example of FIG. 9). However, this alternative path may only be needed for a short period of time as the information about the link failure is transmitted to the central control entity 200 which then determines a new path, taking into account the changed ring topology, and generates new switching instructions.

Figure 10:
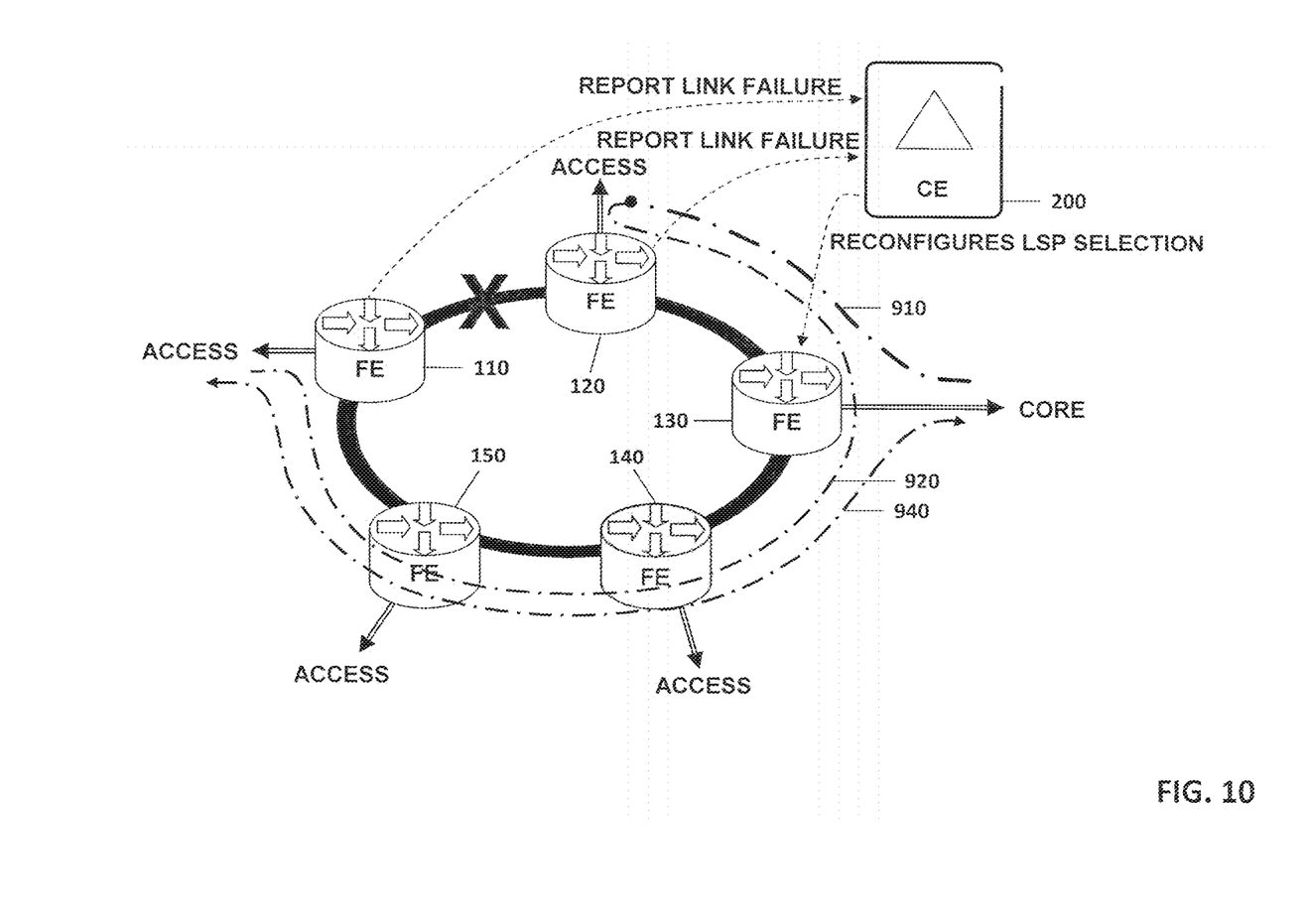
FIG. 10 shows the situation of FIG. 9 after the central control entity has recalculated the paths.

This example is shown in FIG. 10. The two ring nodes 110 and 120 report the link failure to the central control entity as indicated by the dashed lines in FIG. 10. The central control entity then determines new switching instructions for the ring nodes. In the example shown the new switching instructions are transmitted to node 130. Instead of a data transfer 910 and 920 the switching instructions are such that the data transfer 940 is now switched from node 130 via nodes 140 and 150 to node 110. This example is again shown in FIG. 8 in the lower table of FIG. 8. The central control entity calculates a new optimal traffic path for the affected data transfers. In the example shown in FIG. 9 it is the data transfer from node 1 to node 3 and the data transfer from node 3 to node 1. As shown in the left column line 3, the data transfer is now carried out via nodes 5 and 4 and is not switched via node 2 anymore, as indicated in the third line of the left column in the table shown in the middle of FIG. 8.

Summarizing, the upper table of FIG. 8 shows the different paths before the link failure occurs, the middle table shows the traffic paths directly after the reaction at the affected ring nodes, and FIG. 8 shows the paths after the central control entity has recalculated the different paths. The example shown illustrates the two-stage procedure in a reaction to a topology change. In the first stage a local decision is taken at the two affected ring nodes next to the location of the failure. The second stage is the central decision taken at the central control entity which optimizes the different paths taking into account the topology change.

Figure 7:
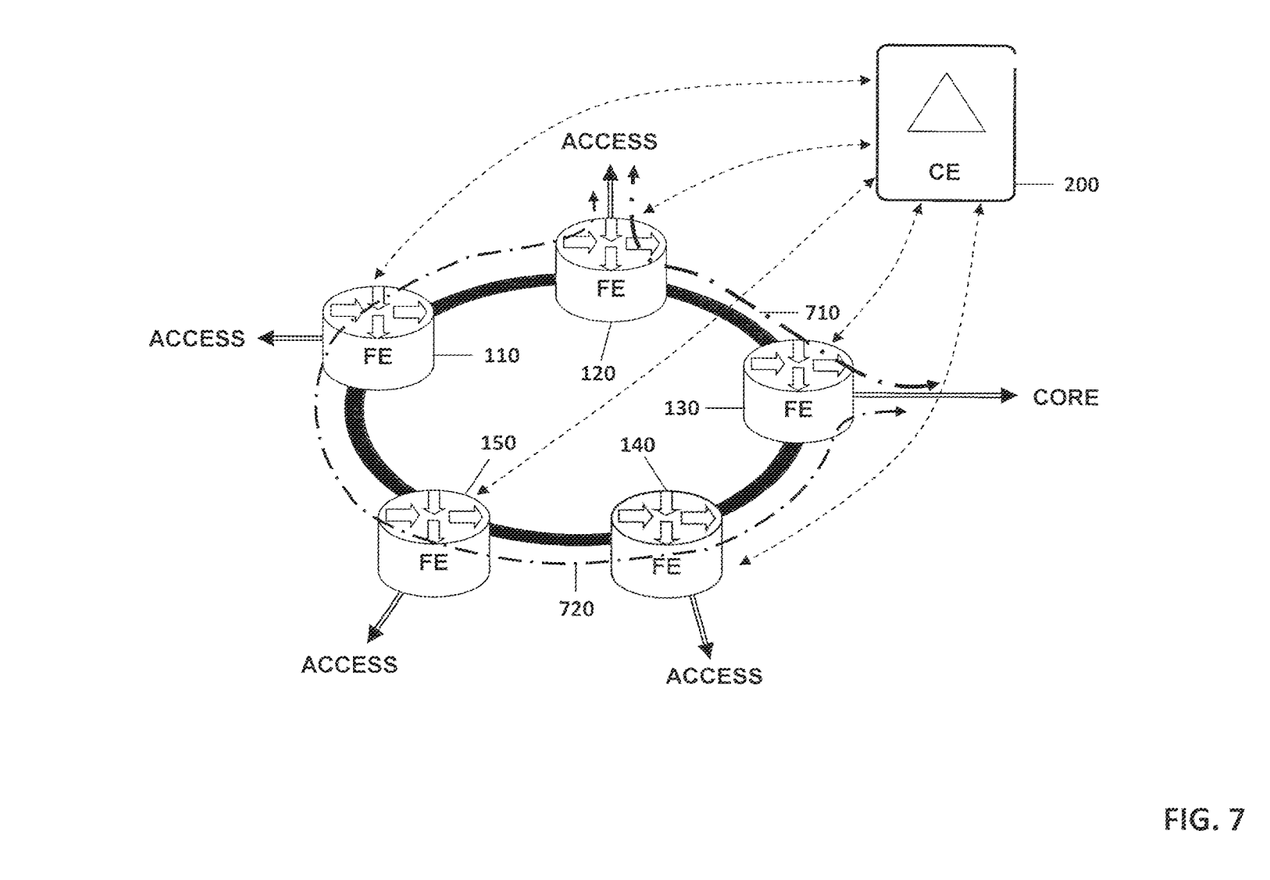
FIG. 7 shows how a central control entity separates a data transfer in dependence on the required quality of service.

In connection with FIG. 7 a further embodiment is shown. With the use of the central control entity it becomes possible to route traffic in a ring topology between the same source and the same destination node differently, e.g. based on quality of service requirements or due to load balancing. In the example shown in FIG. 7, a data transfer 710 is switched directly on its shortest way the ring. The data transfer may be a data transfer requiring a high quality of service, e.g. may contain video data. A second data transfer 720 is shown where traffic demanding a lower quality of service, e.g. during web-browsing, is transmitted from node 130 via nodes 140, 150, 110 to node 120. 710 shows the labels which pass for the high volume high quality service traffic, 720 showing the labels which pass for the traffic demanding lower quality of service.

Figure 11:
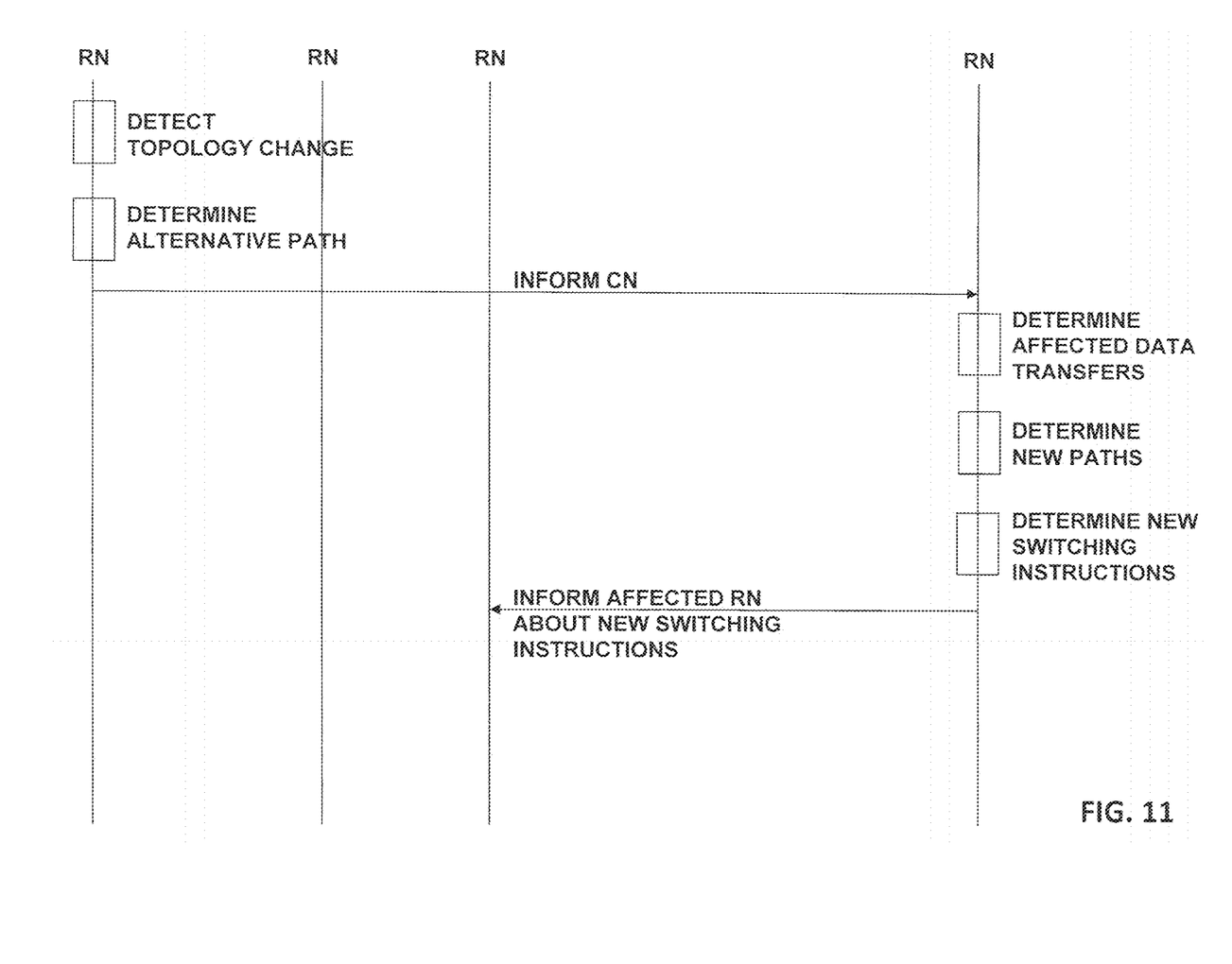
FIG. 11 shows a status diagram explaining the two-stage approach for reacting to a topology change.

In connection with FIG. 11 the two-stage management of a topology change is summarized. In a step S1 one of the ring nodes detects a topology change, in step S2 the ring node can react quickly, can access its look-up table and switch the affected traffic through the alternative port, e.g. in the example of FIG. 9 node 120 switches the traffic back to node 130. In step S3 the ring node can then inform the central control entity about the topology change. The central control entity can then, in step S4, determine the affected data transfers and can determine, in step S5, the new paths for the affected data transfers. In step S6 based on the new paths new switching instructions are determined by the central control entity, which can then be transferred to the ring nodes affected by the new switching instructions. As shown in the example of FIG. 10, the new switching instructions are normally transmitted to another ring node as symbolized by step S7 in FIG. 11.

The central control entity can take central, global measures to optimize the switching paths for the affected traffic in step S6. Before the new switching instructions are determined in step S6 the central control entity may, in an additional step not shown, determine first whether new switching instructions are necessary or not. If the different paths after the switching in step S2 are acceptable in view of traffic requirements, such as delay or throughput, the central control entity may decide to keep the paths for the various data transfers and to wait until the link failure or node failure is cured.

The above explained invention has the advantage that the entire ring can be fully utilized as there is no need to take out a certain segment to avoid routing loops. The routing of loops is avoided by the central control entity. Furthermore, when a link failure occurs a fast remedy is possible by the local reaction of the ring node and it is possible to adapt the traffic to the new situation after the failure by determining new switching instructions by the central control entity.

The invention claimed is:

1. A method for controlling, by a central control entity, a topology change in a network having a ring topology with a plurality of ring nodes via which data packets of various data transfers are transmitted to their corresponding destination nodes, the method comprising:

for a data transfer to a destination node, configuring each ring node, using one or more switching instructions, with both a first output port for the data transfer to the corresponding destination node and an alternative output port for the data transfer to the destination node;

receiving information about a topology change of the ring topology of the network;

determining which of the data transfers are affected by the topology change, based upon the received information about the topology change;

determining, for each of the affected data transfers, a new path through the network;

determining new switching instructions for ring nodes that are affected by the new paths determined for the affected data transfers; and transmitting the new switching instructions to the affected ring nodes, wherein the determined new switching instructions contain information about a new first output port that is a preferred output port for said data transfer to said destination node, taking into account the topology change.

2. The method of claim 1, wherein the central control entity configures the ring nodes as to how to establish connectivity to neighboring ring nodes.

3. The method of claim 1, wherein the central control entity includes the new switching instructions in labels of a Multi-protocol Label Switching (MPLS) mechanism.

4. The method of claim 1, wherein the central control entity selects, for a data transfer between the same source node and the same destination node, among two different transfer paths, one of the two different transfer paths, depending on a predefined network requirement.

5. The method of claim 4, wherein one of the two different transfer paths is selected in dependence on a data rate requirement of a data transfer or in dependence on a load situation on the network, or in dependence on both.

6. The method of claim 1, wherein the central control entity determines which output port of a ring node should be used for a data transfer.

7. The method of claim 1, wherein the central control entity determines a path for a data transfer through the network in such a way that a transmission of the data packets along a closed loop is avoided.

8. The method of claim 1, wherein the new switching instructions are only determined and transmitted when a predefined network criterion is met.

9. A central control entity configured to control a topology change in a network having a ring topology with a plurality of ring nodes, via which data packets of various data transfers are transmitted to their corresponding destination nodes, the central control entity comprising:

a receiver configured to receive information about a topology change of the ring topology of the network;

a database containing, for each of the ring nodes, information about possible connections of each ring node to other nodes of the network and about a status of the possible connections;

a processing circuit configured to, for a data transfer to a destination node, configure each ring node, using one or more switching instructions, with both a first output port for the data transfer to the corresponding destination node and an alternative output port for the data transfer to the corresponding destination node; wherein the processing circuit is further configured to: (i) determine which of the data transfers are affected by the topology change, based upon the received information about the topology change, (ii) determine, for each of the affected data transfers, a new path through the network, and (iii) determine new switching instructions for ring nodes that are affected by the new paths determined for the affected data transfers, wherein the new switching instructions contain information about a new first output port for each of the affected ring nodes that is a preferred output port for said data transfer to said destination node, taking into account the topology change; and a transmitter configured to transmit the new switching instructions to the affected ring nodes.

10. The central control entity of claim 9, wherein the processing unit is configured to select, for a data transfer between the same source node and the same destination node, among two different transfer paths, one of the two different transfer paths, in accordance with a data rate requirement for said data transfer.

11. A method for detecting, by a ring node, a topology change in a network having a ring topology with a plurality of ring nodes via which data packets of different data transfers are transmitted to their corresponding destination nodes, each ring node containing a database in which, for a data transfer to a destination node, a first output port for said data transfer to said destination node and an alternative output port for said data transfer to said destination node are simultaneously held, the method:

detecting, by the ring node, a topology change at a neighboring ring node;

determining, using the ring node's database, for each data transfer affected by the topology change and for which the first output port was selected, the alternative output port;

switching, for each data transfer affected by the topology change, the packets of the affected data transfer along the alternative output port;

transmitting an information about the topology change at the neighboring ring node to a central control entity controlling the ring nodes of the network;

receiving new switching instructions from the central control entity if the ring node is still part of a new path for a data transfer calculated by the central control entity in response to the received information about the topology change; and applying the new switching instructions.

12. The method of claim 11, further comprising establishing connections to neighboring ring nodes in accordance with configuration instructions received from the central control entity.

13. A ring node of a network having a ring topology with a plurality of ring nodes via which data packets of various data transfers are transmitted to their corresponding destination nodes, the ring node comprising:

a database in which, for a data transfer to a destination node, a first output port for said data transfer to said destination node and an alternative output port for said data transfer to said destination node are simultaneously held;

a detector configured to detect a topology change at a neighboring ring node;

a control circuit configured to determine, using the database, for each data transfer affected by the topology change and for which the first output port was selected, the alternative output port, and configured to switch for each data transfer affected by the topology change, the packets of the affected data transfer along the alternative output port; and a transmitter configured to transmit an information about the topology change at the neighboring ring node to a central control entity controlling the ring nodes of the network; and a receiver configured to receive new switching instructions from the central control entity if the ring node is still part of a new path for a data transfer calculated by the central control entity in response to the received information about the topology change;

wherein the control unit is further configured to apply the new switching instruction.

* * * * *